Dec. 1, 1931.  H. BROCK  1,834,200

RECORDING SYSTEM

Filed March 21, 1928

INVENTOR.
Harry Brock
BY
Hoguet and Neary
ATTORNEYS.

Patented Dec. 1, 1931

1,834,200

UNITED STATES PATENT OFFICE

HARRY BROCK, OF STAMFORD, CONNECTICUT

RECORDING SYSTEM

Application filed March 21, 1928. Serial No. 263,437.

This invention relates to an improved recording system for keeping an accumulative record of a business transaction, a client's business, or the like.

It is the usual practise for a business concern to keep records of its transactions on cards, which are filed in card cabinets. Each card generally has an accumulative record of a certain transaction, a client's business, or the like and to each card is added from time to time the various items connected with the transaction or business as they arise. The cards are usually filed alphabetically under the name of the client or the transaction and any given card can thus be conveniently obtained from the card index when desired. An insurance company for example, usually employs a card record digest of its business, arranged under the names of the persons carrying insurance with it with a card to represent the status of each insured and on which is written or printed in an accumulative or progressive manner the various items of that insured's business, such as the premiums, dividends and the like so that the card shows at a glance the present status and entire history of the company's transactions with that insured. The card index system is in universal use in practically every form of business and has been found to be perhaps the simplest, most systematic and convenient system for keeping accumulative records of business transactions with different persons or concerns.

There is one difficulty, however, which is present in the card record system as usually practised. Different cards are frequently called for by employees of the company who have occasion to use the information contained thereon, and these cards may be kept out of the filing cabinet on the employees' desks for some time, causing inconvenience in the entry of new items or to other employees who desire the cards. The withdrawal of the cards from time to time by employees is apt to cause even more serious trouble in that the cards are likely to become lost or mislaid. In any event, the card index is seldom complete, and nearly always certain cards are missing and in the hands of employees.

My invention aims to improve the card recording system and resides particularly in a system in which the cards are never taken from the record room by the employees. According to the invention, the records are kept in black ink on cards composed of a transparent medium such as a tracing cloth or paper and such cards are kept permanently in the record room. Whenever an employee calls for a particular card record, he is given a photostat or photo-negative made from the permanent card and the permanent card is immediately replaced in the index. Tracing cloth is preferred for the permanent cards as the records may be conveniently kept thereon in black ink and a photo reproduction nicely made therefrom. Where the system is such as to require printing or writing on both sides of a card, I prefer to construct the permanent card in the form of an open envelope in which both front and rear sides are composed of the transparent material or tracing cloth with the records written or printed in black ink on the front and rear sides and a stiff sheet of opaque material, preferably colored in a distinguishing manner, is disposed permanently in the envelope between the front and rear sides thereof. The sheet of opaque material forms with the tracing cloth of each side a pocket or receptacle into which a photo-chemically-treated sheet of material may be positioned and the light passing through the tracing cloth reproduces a negative of the record thereon on the treated sheet. A treated sheet may be placed in each pocket of the envelope and thus a photo reproduction of both the front side and of the rear side of the envelope may be made and these reproductions given to the employee who desires the card record. The sheet of opaque material provides a background for the records on the transparent sides of the envelope and serves to reinforce the envelope. The photo reproductions may be kept in envelopes, preferably of transparent material opaque to actinic light, so that the records are not rendered indistinguishable by further photo changes and do not fade. After use by the employee, the envelope and the enclosed photo reproductions are returned to the record room, and may be kept for further use, or until additional records are made on the permanent card when they are, of course, no longer complete. They are then destroyed and new photo reproductions of the permanent card up to date made when needed.

My invention thus provides for supplying photo reproductions of the card record to the employee without removing the permanent card from the record room. These reproductions are exact duplicates of the original record card and the employee using the reproductions is assured that he is viewing the exact record.

For a clearer and more thorough understanding of the invention, reference is to be had to the accompanying drawings wherein Figure 1 is a front view of a permanent record card according to the present invention.

Figure 1:
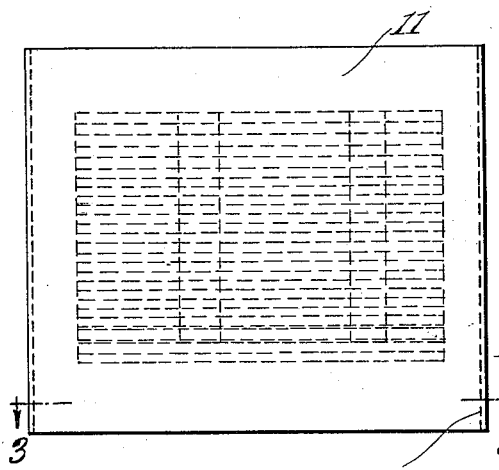
Figure 2:
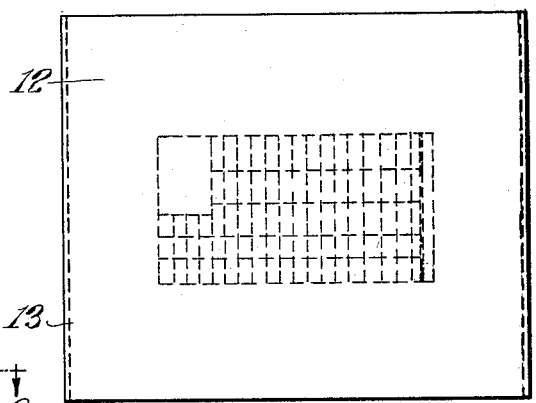
Figure 2 is a rear view of the permanent card.
Figure 3:
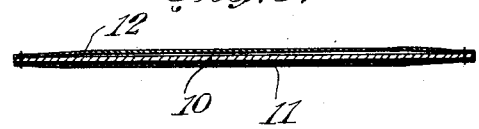
Figure 3 is a cross-section on line 3—3 of Figure 1.
Figure 4:
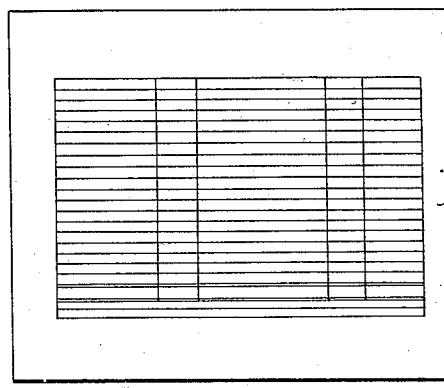
Figure 4 is a photo reproduction of the front side of the permanent card.
Figure 5:
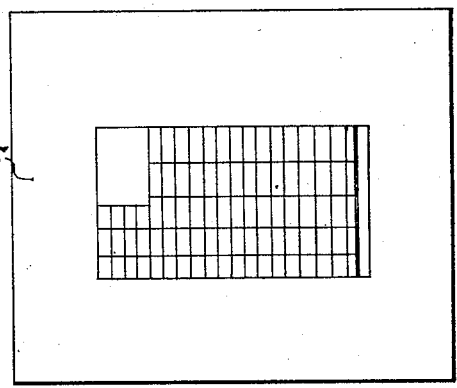
Figure 5 is a photo reproduction of the rear side thereof.
Figure 6:
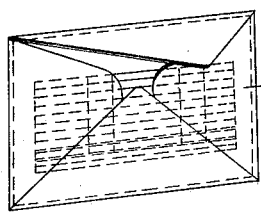
Figure 6 is a view of the envelope used in transporting the photo-reproductions.

Referring more particularly to the drawings, which are to be considered merely as illustrative and to the details of which I do not intend to be confined, the invention is embodied in methods and instrumentalities including a card shown in Figures 1, 2, and 3 and which comprises a stiff sheet of opaque material, 10, to each side of which is attached a sheet of transparent material, such as tracing cloth, providing a front side 11 and a rear side 12. The front and rear sides are preferably stitched, stapled, or otherwise affixed to the sheet of opaque material on the bottom and side edges to form with the opaque sheet, pockets or receptacles open at the top. For instance stitching at the sides is indicated at 13. The records are kept on the front and rear transparent sheets in black ink and the various items recorded thereon as they arise. The sheet of opaque material provides a background allowing the records to be conveniently seen and preventing the records on one transparent sheet appearing through the other. The opaque sheet also adds rigidity to the construction and may be colored in distinctive ways, if desired, similarly to the differently colored cards sometimes used in card systems.

In order to produce a photo reproduction of the front record, a sheet of paper, photo-chemically treated on one side, is placed in the pocket formed between the front transparent sheet, 11, and the opaque sheet, 10, with the treated side next to the front sheet 11. Light is then allowed to pass through the sheet 11 and a photo-negative, 14, of the record thereon is produced on the treated sheet. Similarly, another treated sheet of paper is placed in the pocket between the opaque sheet, 10, and rear side, 12, and a photo-negative 15, of the rear sheet produced. These operations having been performed, the permanent record card is then replaced in the filing cabinet.

The photo-negatives or reproductions are preferably placed in an envelope 16 of transparent material, which is opaque to actinic light so that the light passing through does not affect the photo reproductions or cause fading. The reproductions are placed back to back in the envelope, so that the front card record may be viewed through the front of the envelope and the back card record through the rear of the envelope. The envelope is preferably sealed and delivered to the employee who desires the record. After use by the employee, the envelope with its enclosed matter is returned to the record room. This envelope with its contents may be retained for further use if no further items have been added to the permanent card, but if the permanent card has been altered, it may be discarded and new reproductions made when needed.

While I have described the preferred complete recording system, it will be understood that various changes and alterations may be resorted to in the practice of the invention and I desire to be limited only by the state of the prior art and the scope of the appended claims.

I claim as my invention:—

1. A process for keeping records which comprises keeping the records in ink on cards formed of sheets of transparent material having stiff backs associated therewith to form a pocket between said back and the transparent material, and providing a reproduction of any desired card by allowing light to penetrate the transparent sheet with the records and affect a photo-chemically treated sheet of paper inserted in said pocket.

2. A process for keeping records which comprises keeping the records in ink on cards each formed of a pair of sheets of transparent material having a stiff opaque sheet therebetween forming a plurality of pockets and providing a reproduction of either side of a desired card by placing a photo-chemically treated sheet of paper in the pocket associated with the side of the card to be reproduced and allowing light to penetrate the transparent sheet to affect the sensitive paper.

3. A process comprising keeping records on a card formed of a sheet of material at least partially pervious to light, said sheet forming a pocket with a piece of opaque material associated therewith, and providing a photo reproduction of said records on said card by allowing light to pass through said sheet and affect a piece of photo-chemically treated material placed within said pocket.

In testimony whereof, I have signed my name to this specification this 15th day of March, 1928.

HARRY BROCK.